United States Patent
Dean et al.

(10) Patent No.: US 6,626,605 B1
(45) Date of Patent: Sep. 30, 2003

(54) POLE CONNECTOR ASSEMBLY AND METHOD FOR RACKS AND SHELVING

(75) Inventors: Douglas R. Dean, Snellville, GA (US); Peterjohn R. C. Walters, Conyers, GA (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/085,179

(22) Filed: Feb. 27, 2002

(51) Int. Cl.[7] .................. B42F 13/00; B25G 3/00; F16D 1/00; A47B 9/00
(52) U.S. Cl. .................. 403/344; 403/369; 403/379.6; 108/147.12
(58) Field of Search .................. 248/146; 108/147.11, 108/147.12, 147.13, 147.15, 107; 403/172, 97, 344, 375, 369, 370, 368, 379.6, DIG. 12, 297

(56) References Cited

U.S. PATENT DOCUMENTS

| | | | |
|---|---|---|---|
| 470,514 A | | 3/1892 | Simpson |
| 582,948 A | * | 5/1897 | Pinover .................. 403/297 |
| 618,639 A | * | 1/1899 | Bullard .................. 403/103 |
| 1,051,427 A | | 1/1913 | McCluskey |
| 2,356,199 A | | 8/1944 | Battermann |
| 2,703,724 A | | 3/1955 | Der Yuen et al. |
| 2,868,602 A | | 1/1959 | Drezner |
| 3,004,784 A | * | 10/1961 | Selby .................. 287/2 |
| 3,461,772 A | * | 8/1969 | Barry .................. 403/103 |
| 4,068,346 A | | 1/1978 | Binder |
| 4,141,554 A | | 2/1979 | Sherwin |
| 4,147,444 A | * | 4/1979 | Herb et al. .................. 403/313 |
| 4,164,084 A | * | 8/1979 | Crockett .................. 40/660 |
| 4,484,407 A | | 11/1984 | Petersson |
| 4,595,107 A | * | 6/1986 | Welsch .................. 108/147.13 |
| 4,627,543 A | * | 12/1986 | Nicely .................. 108/147.13 |
| 4,645,473 A | * | 2/1987 | Mochizuki .................. 464/79 |
| 4,754,712 A | | 7/1988 | Olson et al. |
| 4,809,401 A | * | 3/1989 | Honig .................. 16/87.2 |
| 4,952,092 A | | 8/1990 | Ballerstein |
| 4,958,953 A | * | 9/1990 | Charondiere .................. 403/297 |

(List continued on next page.)

FOREIGN PATENT DOCUMENTS

| | | | | |
|---|---|---|---|---|
| FR | 745561 | * | 1/1932 | .................. 287/117 |
| FR | 879842 | * | 11/1941 | .................. 403/297 |
| FR | 1.278.327 | * | 1/1961 | .................. 403/297 |
| FR | 1.457.785 | * | 8/1965 | .................. 350/287 |
| GB | 405110 | * | 1/1933 | .................. 403/297 |
| GB | 591253 | * | 6/1946 | .................. 287/2 |

OTHER PUBLICATIONS

"Curent Split Pole Joining Methods" sheet, dated Apr. 18, 2001.

*Primary Examiner*—Leslie A. Braun
*Assistant Examiner*—Amy J. Sterling
(74) *Attorney, Agent, or Firm*—Michael Best & Friedrich LLP (57) ABSTRACT

Several embodiments of the present invention provide a pole connector assembly for connecting adjacent pole sections in order to construct a pole. Preferably, these pole connector assemblies have two inserts connected together by a fastener. Each of the two inserts is received within an open end of a respective pole section. The fastener is preferably received within an aperture in each of the inserts in order to connect the pole sections together. In some preferred embodiments, each insert has at least one projection that extends into the pole section within which the insert is received. Preferably, the projection can be deflected in order to engage (or more fully engage) the insert within its corresponding pole section. Preferably, the projection can be deflected by the fastener and/or by one or more internal surfaces of the pole section as the insert is inserted within the pole section.

33 Claims, 6 Drawing Sheets

U.S. PATENT DOCUMENTS

| | | | |
|---|---|---|---|
| 4,997,304 A | * 3/1991 | Choy | 403/8 |
| 5,409,122 A | 4/1995 | Lazarus | |
| 5,429,447 A | * 7/1995 | Wood | 403/46 |
| 5,688,066 A | * 11/1997 | Loose | 403/297 |
| 5,704,728 A | 1/1998 | Chan | |
| 5,779,070 A | * 7/1998 | Dickinson et al. | 211/181.1 |
| 5,803,843 A | * 9/1998 | Anderson et al. | 473/578 |
| 5,881,653 A | 3/1999 | Pfister | |
| 5,902,420 A | * 5/1999 | Wissenbach et al. | 148/525 |
| 6,045,291 A | * 4/2000 | Ruehle et al. | 403/297 |
| 6,065,407 A | * 5/2000 | Wang | 108/110 |
| 6,095,713 A | * 8/2000 | Doyle et al. | 403/103 |
| 6,241,108 B1 | * 6/2001 | Nakatani et al. | 108/108 |
| 6,247,414 B1 | * 6/2001 | Sikora et al. | 108/147.13 |
| 6,260,488 B1 | * 7/2001 | Yang et al. | 108/107 |
| 6,287,044 B1 | * 9/2001 | Huber | 403/297 |
| 6,352,439 B1 | * 3/2002 | Stark et al. | 174/65 R |

* cited by examiner

POLE CONNECTOR ASSEMBLY AND METHOD FOR RACKS AND SHELVING

FIELD OF THE INVENTION

The present invention relates to pole connector assemblies and devices, and more particularly to pole connector assemblies and devices for joining support post sections used in adjustable racks, shelving, and similar applications.

BACKGROUND OF THE INVENTION

Many existing shelving and rack systems are constructed of one or more poles connected to one or more shelves or racks. In some cases, the shelves or racks can be adjustably connected to the poles at different heights. Also, each pole often includes two or more pole sections that are connected in an end-to-end fashion by pole connector devices or assemblies. Pole connector devices and the poles assembled with such devices are preferably strong, lightweight, easy to assemble (and in some cases, disassemble), and relatively inexpensive. However, existing pole connector devices fail to balance these design considerations well, invariably resulting in pole connector device designs that are lacking in one or more respects. Conventional pole connector devices and assemblies are often unreliable, heavy, slow to assemble and disassemble, expensive to manufacture, and difficult to properly align and adjust.

For example, many conventional pole connector devices include a plurality of pole inserts that are inserted into the ends of pole sections. These pole connector devices are used to connect adjacent pole sections in end-to-end fashion as mentioned above. Such pole connector devices can have one or more exterior threaded surfaces. Many types of pole inserts are die cast, and have threads machined into the exterior surface(s) of the inserts. The threaded pole inserts are threaded into threaded ends of the pole sections to connect the pole inserts to the pole sections and to connect adjacent pole sections together.

Some existing threaded inserts are formed of a single piece or assembly having a separate threaded portion on each end of the insert for threaded connection with an internally threaded pole section. Other threaded inserts are threaded only on one end for threaded connection with a pole section. In such cases, the threaded inserts are inserted into the ends of adjacent pole sections and are then connected together with a fastener to connect the adjacent pole sections. By way of example only, the fastener can be rod threaded on each end. After the inserts are inserted into the ends of adjacent pole sections, one end of this fastener type is threaded into a threaded aperture in one of the inserts. The opposite end of the fastener is then threaded into a threaded aperture in the other insert and is tightened to connect the adjacent pole sections together.

The machining required for threading conventional pole inserts is expensive and can represent a significant part of the cost of a shelving and rack system. Such machining also adds an additional step in the manufacturing process and can significantly add to the time needed to produce a shelving and rack system. Although a number of alternatives exist to machining threads into the pole inserts and pole section ends (e.g., casting or molding threads), each of these alternatives adds significant costs to the manufacturing process in one or more ways, such as through expensive molds and molding machinery, etc.

The use of threaded pole inserts can also add significant time to the pole assembly process, especially when several pole sections and several rack or shelf systems need to be assembled. Such inserts and pole sections can be difficult to thread together, and in some cases may not properly align to form a straight pole. If threaded correctly, an insert threads into a pole along a central pole axis extending parallel to the walls of the pole. In some cases, the threads on the insert may become misaligned with the threads of the pole during assembly, causing the insert to become misaligned with respect to the pole axis and result in an unstable pole connection. Such unstable pole connections can be difficult to detect by the assembler. In addition to misalignment problems, the process of tightening the pole inserts into the pole sections during assembly and of loosening such connections during disassembly can be difficult, often requiring significant strength and/or tools. Also, threaded inserts can loosen as a result of rack or shelf use and vibration, resulting in unreliable connections between pole sections.

Other types of pole section connectors do not employ threaded connections to the pole sections. For example, some pole section connectors employ inserts that are received into the ends of the pole sections and are attached thereto by adhesive or cohesive bonding material. Such pole section connectors can be difficult to properly align (while the bonding material sets and/or while the inserts are assembled with the pole sections). It can also be difficult for an assembler or user to detect when the bonding material has failed or is otherwise unsatisfactory for bearing normal loads. In addition, the use of bonding material for pole section connections can make pole disassembly problematic or even impossible.

In light of the problems and limitations described above, a need exists for pole assembly connectors that enable quick assembly and disassembly of rack or shelf poles, can be inexpensively manufactured, are easy to properly align and assemble, and provide a strong and reliable connection between pole sections. Each preferred embodiment of the present invention achieves one or more of these results.

SUMMARY OF THE INVENTION

In one aspect of the present invention, a pole connector assembly is employed between adjacent pole sections in order to construct a pole. Some preferred embodiments of the pole connector assembly have two inserts connected together by a fastener. Each of the two inserts is received within an open end of a respective pole section. The fastener is preferably received within an aperture in each of the inserts in order to connect the pole sections together.

In some preferred embodiments of the present invention, each insert has at least one projection that extends into the pole section in which the insert is received. Preferably, the projection can be deflected in order to engage (or more fully engage) the insert within its corresponding pole section. The projection can be deflected by the fastener or by one or more internal surfaces of the pole section as the insert is inserted within the pole section.

Preferably, the fastener is received within the aperture of the insert as mentioned above. By inserting the fastener in the aperture, the fastener preferably deflects the projection to engage the inside surface of the pole section and to thereby secure the insert in the pole section. In some preferred embodiments, the fastener and the aperture in the insert are threaded so that threading the fastener in the insert aperture causes the projection to deflect and to engage the inside surface of the pole section.

Any number of insert projections can be employed for purposes of securing an insert to a pole section. However, the insert most preferably has a plurality of such projections, each separated by a space so that each can be deflected with respect to the others. For example, the insert can have four projections that surround the aperture within which the fastener is received. The four projections can be separated by grooves in the insert (which grooves can be cuts made in the insert to define the four projections). When the fastener is inserted within the aperture, such as by being threaded into the aperture, the four projections expand and deflect from one another, and thereafter contact and preferably press against the inside surfaces of the pole section in which the insert is installed.

The projections of the inserts can engage with the pole sections in different manners in order to secure the inserts within the pole sections. In some cases, the projections press against the interior surfaces of the pole sections and thereby frictionally engage the inserts with the pole sections. In these and in other cases, the projections can have one or more features that mate or otherwise engage with one or more features on the inside of the pole section upon deflection of the insert projections. For example, the projections can have a circumferential groove therein which mates with a circumferential tongue on the inside of the pole section. The circumferential tongue can be defined by a circumferential recess on the exterior of the pole section. Such recesses are commonly used to connect racks and shelves to poles. When the grooved projections of the insert are deflected, the grooves on the insert mate with the internal tongue of the pole section to engage the insert with the pole section. Still other types of engagable elements and features on the deflectable projections and on the pole sections are possible, each one of which falls within the spirit and scope of the present invention.

In some embodiments of the present invention, the inserts each have a cap portion that is preferably larger than the inner diameter of the pole sections being connected and that preferably abuts the end of a pole section. Although the inserts do not require a cap portion, this feature provides additional stability to the pole connection assembly. Also, the cap portion (e.g., a peripheral edge of the cap portion) can be chamfered, beveled, or otherwise recessed so that the pole connector assembly has a circumferential groove at the pole section interface to which shelves and racks can be connected.

The elements making up the pole connector assembly of the present invention are relatively simple and inexpensive to manufacture, particularly because a number of the embodiments employ only one threaded connection for each insert (as opposed to two threaded connections commonly used in existing pole connectors). In addition, the snap-fit and positive engagement provided by the inserts of the present invention help to provide a more reliable and stronger pole connection that is also easier to align and adjust. Also, assembly of the various embodiments requires minimal strength and skill, with no need to employ bonding agents or to align parts during the assembly process.

More information and a better understanding of the present invention can be achieved by reference to the following drawings and detailed description.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE DRAWINGS

Figure 1:
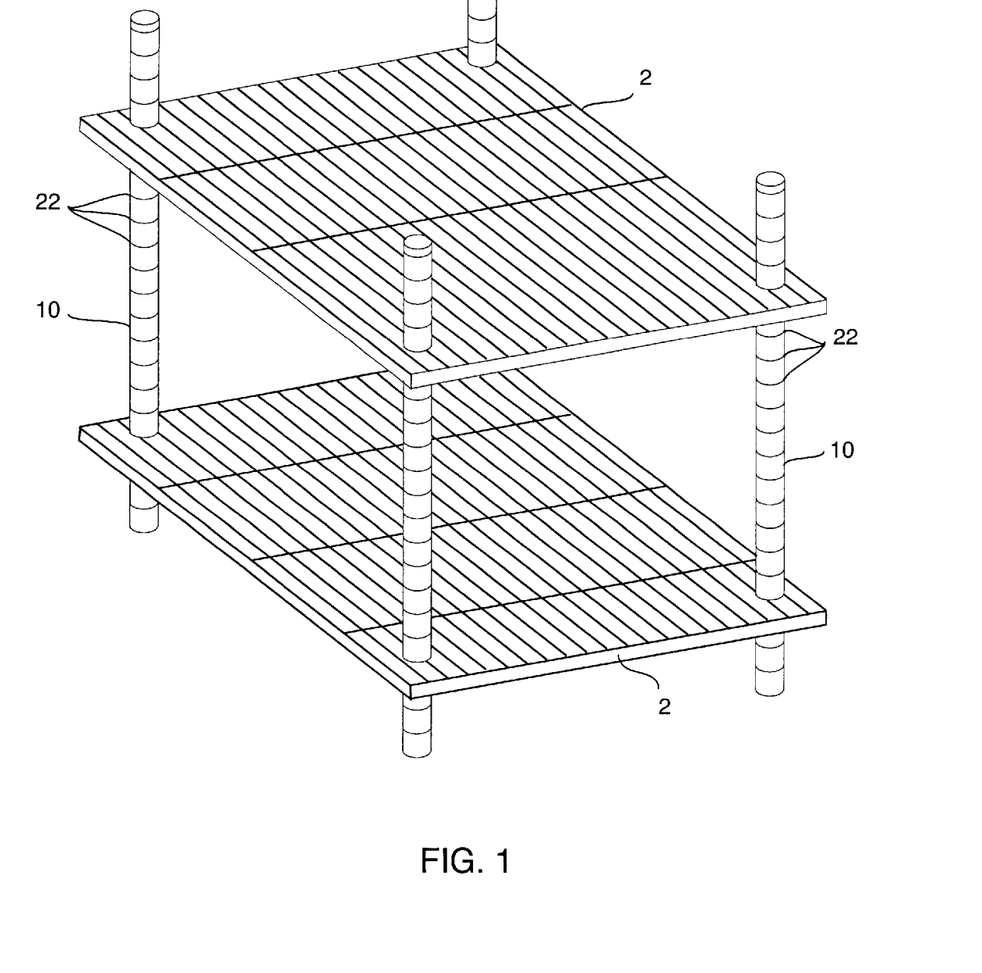
FIG. 1 is a perspective view of a shelf assembly employing poles according to a first preferred embodiment of the present invention.

The present invention is described in terms of its application to poles for adjustable and non-adjustable shelves and racks such as that shown in FIG. 1. An example of such a shelf assembly is disclosed in U.S. Pat. No. 4,852,501 issued to Olson et al., the disclosure of which is incorporated herein by reference insofar as it relates to shelf assemblies and adjustable shelf assemblies. However, the present invention can be employed in any application in which two pole sections must be connected in an end-to-end fashion.

Figures 2, 3:
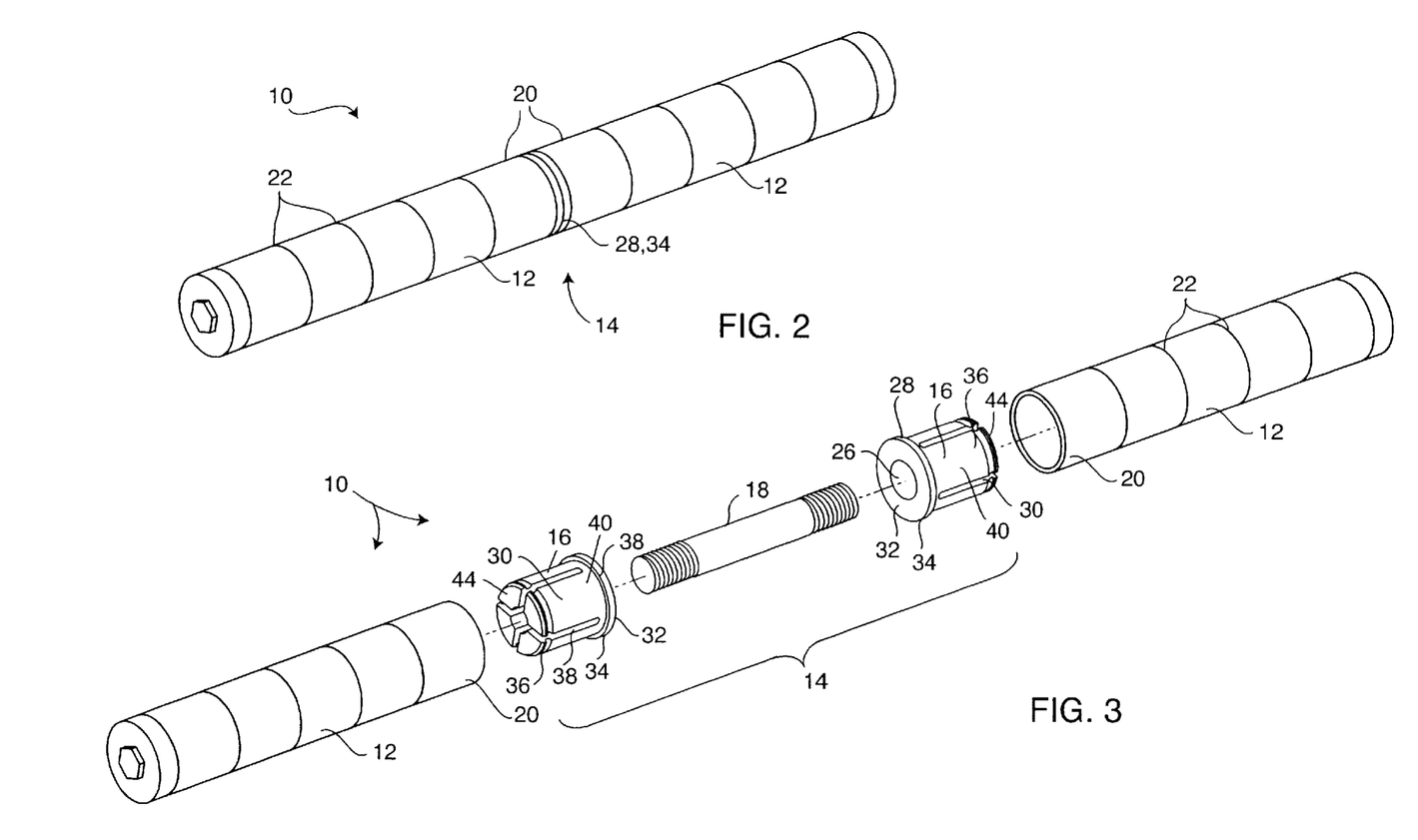
FIG. 2 is perspective view of a pole illustrated in FIG. 1.
FIG. 3 is an exploded perspective view of the pole illustrated in FIGS. 1 and 2.

FIGS. 2 and 3 illustrate a pole according to one preferred embodiment of the present invention. The pole 10 has at least two pole sections 12 connected in end-to-end fashion as will be described in greater detail below. Although the pole 10 in FIGS. 2 and 3 has only two pole sections 12, it should be noted that a pole 10 having any number of pole sections 12 and pole section lengths is possible according to the present invention.

Figure 5:
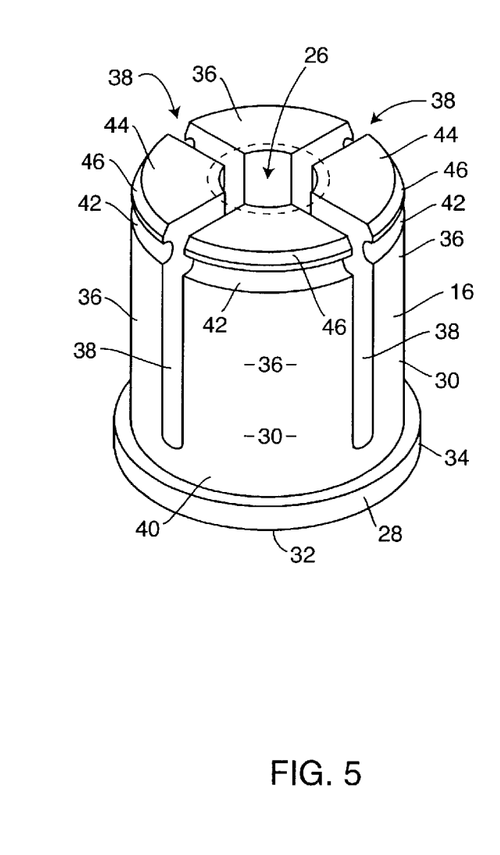
FIG. 5 is an elevational cross-sectional view of a pole connector assembly illustrated in FIGS. 2 and 3.

FIGS. 3 and 5 illustrate a pole connector assembly (indicated generally at 14) according to a preferred embodiment of the present invention. The pole connector assembly 14 includes two inserts 16 and at least one fastener 18. As will be described in greater detail below, each insert 16 is inserted into an end 20 of a pole section 12 to be joined to another pole section 12. Preferably, the fastener 18 connects the inserts 16 together.

Each pole section 12 preferably has a hollow cylindrical shape with a central axis, and includes at least one open end to which the pole connection assembly 14 is connected. The opposite end of each pole section 12 can be open (whether for connection to another pole connection assembly or otherwise) or can be closed.

The pole sections 12 can have any cross-sectional shape desired, including without limitation round, oval, elliptical, rectangular, triangular, or other polygonal cross sectional shapes, and poles having irregular or unusual cross-sectional shapes. Although the cross-sectional size and shape of each pole section 12 is preferably constant along its length, this need not necessarily be the case.

Some preferred embodiments of the pole sections 12 have a plurality of external circumferential recesses or grooves 22. As is well known to those skilled in the art, these grooves 22 can be used to secure shelves or racks to the poles 10. Preferably, multiple grooves 22 enable the attachment of multiple shelves or racks 2 (see FIG. 1) to the poles 10 and/or permit the shelves or racks 2 to be secured at a variety of points along the poles 10. The manner in which racks or shelves can be connected to a grooved pole 10 is well-known to those skilled in the art and is not therefore described further herein. In other embodiments of the present invention, the pole sections 12 can be provided with other features and elements enabling connection of racks or shelves 2 to the poles 10. Such features and elements include without limitation a plurality of apertures along the pole sections 12, ribs, studs, bosses, flanges, lips, pins, or other protrusions extending from the surface of the pole sections 12, and the like. In still other embodiments of the present invention, the surfaces of the pole sections 12 are relatively featureless (such as when clamps, setscrews, or other fasteners are used to clamp the racks or shelves 2 in place on the pole sections 12).

The insert 16 is inserted into the open end of the pole section 12 and preferably snaps into place within the pole section 16. As will be described in greater detail below, the insert 16 preferably has a snap engagement with a tongue 24 or other protrusion on the inside of the pole section 16 formed by at least one of the recesses 22 in the pole section 16. More specifically, the tongue 24 preferably provides a snapping location for the insert 16 when the insert 16 is inserted into the open end of the pole section 12. Other manners of engagement between the insert 16 and the pole section 12 are possible and will also be described in greater detail below.

Each insert preferably has a cross-sectional shape that is similar or corresponds to the cross sectional shape of the pole section end 20 into which the insert 16 is received. However, the insert can take any other shape desired that is capable of connection with the pole section end 20 as described below. In the illustrated preferred embodiment, the inserts 16 and pole sections 12 have generally round cross sections by way of example only.

Figure 4:
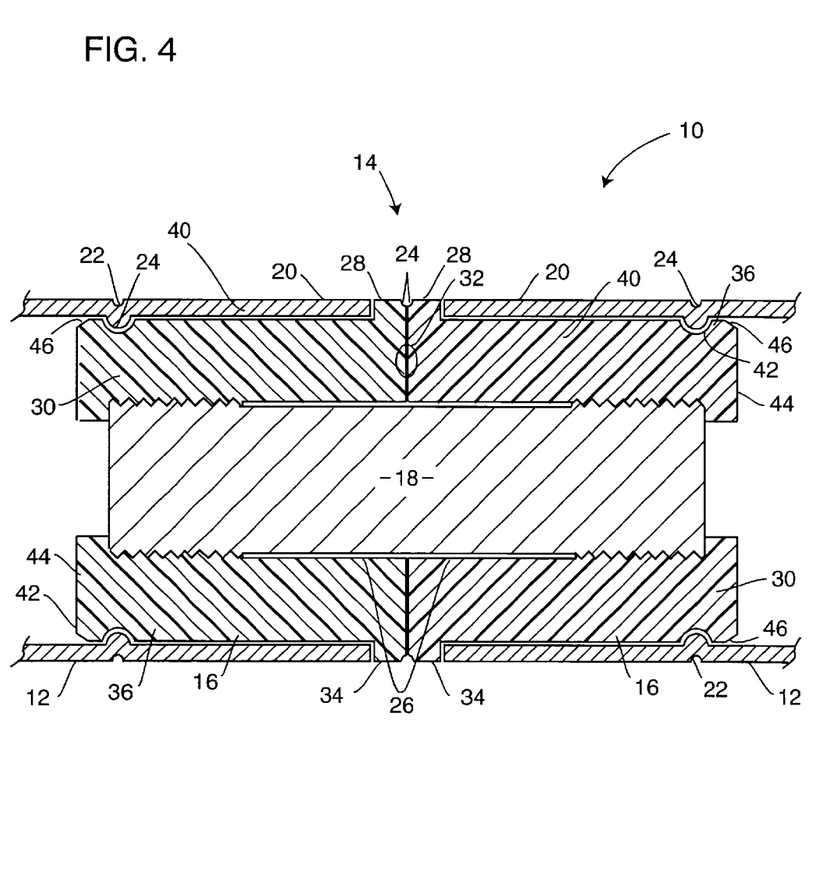
FIG. 4 is a perspective view of an insert of a pole connector assembly illustrated in FIG. 3.

With reference to FIGS. 3–5, some embodiments of the present invention employ an insert 16 having an aperture 26 therein for receiving a fastener 18. The insert 16 preferably also has a body portion 30 that at least partially extends into the end 20 of a pole section 12. Also, the insert 16 preferably has a cap portion 28 that is located at least partially outside of the pole section 12. Although the cap portion 28 preferably has a cross-sectional shape that is similar to that of the body portion 30, the cap portion 28 can have any other cross-sectional shape desired.

The cap portion 28 of the insert 16 is preferably larger in diameter than the body portion 30, and is also preferably larger in diameter than the internal diameter of the pole section 12. Therefore, the cap portion 28 can abut the end of the pole section 12 to "cap" the pole section 12. In some preferred embodiments of the present invention, the cap portion 28 has an outer diameter that is the same or substantially the same as the outer diameter of the pole section 12. However, the cap portion 28 can have a larger diameter if desired. In those embodiments where it is not desired or necessary to have a surface of the cap portion 28 abut the end 20 of the pole section 12, the cap portion 28 can be smaller in diameter than the wall defining the pole section 12.

The insert 16 preferably has a surface 32 that faces away from the pole section 12 into which the insert 16 is inserted. This interface surface 32 can be substantially flat and featureless or can have any shape desired (e.g., concave, convex, grooved, ribbed, and the like). A substantially flat interface surface 32 is highly preferred to produce a stable interface with a confronting insert 16 as will be described in greater detail below.

In some embodiments, the peripheral edge of the interface surface 32 can have a shape that is complimentary with the peripheral edge of the interface surface 32 of a confronting insert 16. For example, and with continued reference to FIGS. 3–5, the peripheral edge 34 of the interface surface 32 preferably has a circumferential groove, chamfer, or other recess defined therein. When placed in an abutting relationship with another confronting insert 16, the resulting peripheral interface between the inserts 16 can be a recess having any desired shape. In some preferred embodiments, this recess shape is similar to recesses located at other points along the pole sections 12. As another example, the peripheral edge 34 of the interface surface 32 can have one or more lips, ledges, extensions, or other protrusions that define any desired shape of the interface between confronting inserts 16 when abutted against one another. Although similarly-shaped abutting inserts 16 are highly preferred to generate an interface shape between two abutting inserts 16 as just described, in some embodiments only one of the abutting inserts 16 may have a recess, protrusion, or other feature in the peripheral edge 34 of the interface surface 32. In still other embodiments, neither insert 16 has such a feature.

Whether either or both peripheral edges 34 of abutting inserts 16 have recesses, protrusions, or other features, the resulting exposed external surfaces of the abutting inserts 16 can be shaped to mimic or duplicate external features of the pole sections 12 (including those portions of the pole sections 12 to which shelves or racks 2 can be connected as described above). For example, the shape of the interface between the abutting inserts 16 in the illustrated preferred embodiment can be the same or similar to the shape of the recesses 22 in the pole sections 12. The interface between abutting inserts 16 can therefore define another location at which shelves or racks 2 can be connected to the pole 10. Alternatively, any other external surface of either or both abutting inserts 16 can be shaped for this purpose.

The body portion 30 of the insert 16 preferably has a generally round cross-sectional shape. As described above, however, the insert 16 (and the body portion 30 thereof) can have any cross-sectional shape desired. The body portion 30 of the insert 16 preferably extends away from the cap portion 28 along the axis of the insert 16 in a direction opposite the interface surface 32. The body portion 30 is preferably slightly smaller than the inside of the pole section end 20. For example, for generally round pole sections 12 and inserts 16 as illustrated in the figures, the body portion 30 preferably has a diameter slightly smaller than the inner diameter of the end 20 of the pole section 12. Most preferably, a clearance fit exists between the body portion 30 and the pole section 12, although a light interference fit can be used in some embodiments. The fit between the body portion 30 of the insert 16 and the end 20 of the pole section 12 can therefore be loose, snug, or relatively tight as desired.

The body portion 30 of the insert 16 preferably has one or more projections 36 that extend away from the interface surface 32 of the insert 16. In some preferred embodiments, the projections 36 extend in a direction generally parallel to the axis of the insert 16. The insert 16 is preferably made of a strong and resilient material such as steel, aluminum, or other metal, high-strength plastic, composites, and the like. The projections 36 can be separate elements attached to the remainder of the insert 16 in any conventional manner (such as by welding, soldering, or brazing, by one or more conventional fasteners, by a press fitting or threaded connection with the remainder of the insert 16, and the like). More preferably however, the projections 36 are integral with the remainder of the insert 16.

As will be described in greater detail below, the projections 36 can be slightly deflected under stress during insertion and connection of the insert 16 into the pole section 12. Because the insert (or at least the projections 36 thereof) is preferably made of resilient material, the projections are inherently biased toward their pre-stressed states.

Although four projections 36 are illustrated in the embodiment of FIGS. 3–5, any number of projections can be used as desired. Most preferably, two or more projections 36 are employed, and are separated by spaces to permit a degree of flexibility of the projections 36 with respect to one another and the pole section 12. In the illustrated preferred embodiment for example, the four projections 36 are separated by slots 38 that are substantially parallel to the axis of the insert 16. The slots 38 extend from a base 40 of the body portion 30 to the ends of the projections 36.

The projections 36 can each have any cross-sectional shape desired, and preferably collectively define a body shape that is similar to the internal shape of the pole section end 20 as discussed above. For example, the projections 36 in the insert illustrated in FIGS. 3–5 are elongated and have a semi-annular cross-sectional shape. In other embodiments, the projections 36 can be a series of elongated fingers each having a round, oval, polygonal, or other cross-sectional shape that may or may not vary along the length of the projections 36. Furthermore, the projections 36 can each have the same or different cross-sectional shapes and lengths as desired.

In some preferred embodiments of the present invention, the inserts 36 are engagable with one or more interior projections or features within the pole sections 12, thereby resulting in a strong and reliable connection between the inserts 36 and the pole sections 12. By way of example only, the projections 36 in the illustrated preferred embodiment have an external groove 42 that preferably circumferences the body portion 30 of the insert 16 and penetrates into the outer surfaces of the projections 36. The groove 42 can lie in a plane generally perpendicular to the axis of the insert 16 as shown in the figures, or can be oriented in other manners as will be discussed in more detail below. The groove 42 is preferably located at a point along the body portion 30 of the insert 16, such that the groove 42 engages the tongue 24 (see FIG. 5) on the interior surface of the pole section 12 when the insert 16 is inserted into the open end 20 of the pole section 12 (and preferably, when the cap portion 28 contacts the pole section end 20 in those embodiments of the insert 16 having a cap portion 28). Although the groove 42 is preferably located near a distal end of the body portion 30, the groove 42 can be located anywhere along the body portion 30 in order to enable engagement of the groove 42 with the tongue 24 (when the cap portion 28 contacts the pole section end 20 or otherwise).

As mentioned above, the insert 16 in the illustrated preferred embodiment is preferably engagable with the pole section 12 by an engagement between the groove 42 in the projections 36 of the body portion 12 with a tongue 24 extending internally into the pole section 12. In some embodiments, the tongue 24 is defined at least partially by a recess 22 on the exterior surface of the pole section 10 as described above. In other embodiments, the tongue 24 can be defined by a separate element connected to or otherwise formed on an internal surface of the pole section end 20, such as a ring welded, press or snap-fit, brazed, or fastened with one or more conventional fasteners to the inside of the pole section end 20, a bead of metal or welding deposit left upon the interior surface of the pole section end 20, and the like.

A number of alternatives exist to the tongue and groove connection between the insert 16 and pole section 12 described above and illustrated in FIGS. 3–5. For example, the locations of the tongue 24 and the groove 42 can be reversed, whereby a tongue or other projection on the body portion 30 of the insert 16 is engagable with a groove or other recess in the inside surface of the pole section end 20. In other embodiments, the tongue and groove connection described above can be replaced by a number of other engagable elements and features of the insert 16 and pole section 12. By way of example only, one or more pins, knobs, fingers, ledges, ramps, bosses, or other projections on the body portion 30 of the insert 16 can be engagable with one or more similar elements or with one or more apertures, grooves, dimples, or other recesses in the inside wall of the pole section 12 (and vice versa). Like the tongue and groove connection described above, such a relationship between the body portion 30 of the insert 16 and the inside surface of the pole section 12 is preferably a snap fit to result in a strong and reliable connection between these elements.

Although the groove 42 in the illustrated preferred embodiment is preferably located on projections 36 of the insert 16 as described above, this need not necessarily be the case. Specifically, the groove 42 can be located on a body portion 30 having no identifiable projections 36. A groove 42 located on projections 36 of an insert 16 is preferred because the projections 36 permit flexure of the body portion 30 during insertion of the insert 16 into the pole end 20 and during connection of the tongue 24 within the groove 42. This flexure is enabled by the elongated nature of the projections 36 and, in the case of multiple projections 36, by the slots 38 or other spaces located between the projections 36 as described above. The flexure can result in a more secure connection of the insert 16 and the pole end 20 into which the insert 16 is received. However, in some cases a sufficiently strong and reliable connection is provided without any significant flexure of the projections 36. In other cases, such a connection is possible without the use of projections 36 at all.

The preceding discussion regarding the tongue and groove relationship between the insert 16 and the pole end 20 applies equally to other types of features and elements (described above) used to connect the insert 16 to the pole end 20. In any case, the feature or element(s) which engage with the insert 16 can be oriented in any manner with respect to the axis of the pole section 12. For example, the orientation of the tongue 24 in the pole end 20 can be at any angle with respect to the axis of the pole section 12. However, the orientation of the tongue 24 (or other element or feature to which the insert 16 connects) with respect to the pole section 12 is preferably dependent at least in part upon the orientation of the groove 42 in the pole end 20 to which the tongue 24 connects. Although one tongue and groove connection is preferably used to connect each insert 16 to a pole section 12, it will be appreciated by one having ordinary skill in the art that multiple tongues 24 and multiple grooves 42 can connect each insert 16 within a pole section 12 in a manner as described above.

In some preferred embodiments of the present invention, the projections 36 of the insert 16 also include a lead surface 44 having a tapered edge 46. The lead surface 44 is that surface of the body portion 30 that is located farthest from the cap portion 28 (when used) and from the interface surface 32 of the insert 16. Although not required, the lead surface 44 is preferably flat, and is in a plane generally perpendicular to the axis of the insert 16. Alternatively, the lead surface 44 can have any other shape desired and can be disposed at any angle or multiple angles with respect to the axis of the insert 16. The tapered edge 46 of the lead surface 44 facilitates easier insertion of the insert 16 into the end of the pole section 12. Also, the tapered edge 46 of the lead surface 44 can act as a ramp against which the tongue 24 of the pole section 12 rides as the insert 16 is inserted into the pole section 12. This ramping action can facilitate an easier snap-fit of the insert 16 into the pole section 12. In those embodiments of the insert 16 having projections 36 as described above, the tapered edge 46 of the lead surface 44 can also act as a ramp to deflect the projections 36 as the insert 16 is moved into an engaged position with respect to the pole section 12.

Preferably, when the insert 16 is inserted into an end 20 of the pole section 12, the projections 36 contact the tongue 24 in the pole section end 20 and then deflect under insertion force as the insert 16 is pushed into the pole section end 20. When the tongue 24 in the pole section end 20 becomes aligned with the groove 42 in the insert 16, the projections 36 preferably spring back or otherwise return to their pre-deflected state. This action of the projections 36 serves at least one of two purposes: to create a positive engagement of the tongue 24 and groove 42 and to generate a force of the projections 36 upon the inside of the pole section 12. As mentioned above, the tongue and groove connection between the insert 16 and the pole section 12 can be replaced by a number of other elements and structures also generating an engagement between the insert 16 and the pole section 12. In such cases, the resilient deflection and return of the projections 36 can function in a similar manner as described above with reference to the tongue and groove connection in the illustrated preferred embodiment. Although interengaging elements or features of the insert 16 and the pole section 12 are not required to practice the present invention, they can be employed to generate a stronger pole section connection in any of these manners.

As mentioned above, some embodiments of the present invention have inserts with resilient projections 36 used to engage with a pole section 12 by generating a pressure against the inside walls of the pole section end 20. Whether or not such resilient projections are also used to engage features or elements on the insert 16 and pole section end 20, this pressure can be sufficient to retain the insert 16 in place within the pole section 12 even under significant axial and torsional forces. To generate large frictional forces between the projections 36 and the inside walls of the pole section end 20, the projections 36 of the insert 16 can have a tight fit with the pole section end 20 as the insert 16 is pushed into the pole section end 20. Otherwise, the inside of the pole section end 20 can have a ramped or conical shape which narrows with increasing distance from the pole section end 20, a stepped inner diameter upon which the projections 36 ride as the insert 16 is pushed into the pole section end 20, or any other interior shape causing the projections to be inwardly compressed or otherwise deflected when the insert 16 is forced into the pole section end 20. As mentioned above, the insert 16 can have a tapered leading edge 46 to ease insertion of the insert 16 in any of these embodiments.

In some preferred embodiments of the present invention, the inserts 16 of adjacent pole ends 20 are connected together by a threaded fastener 18. For this purpose, the body portions 30 of the inserts 16 can have an internally-threaded aperture 26. In those embodiments of the inserts 16 having projections 36, this aperture 26 is preferably defined by the interior surfaces of the projections 36 (such as at the terminal half of the insert 16 ending at the lead surface 44 of the insert 16).

The fastener 18 is preferably threaded into the threaded portion of the insert 16. The fastener 18 is a threaded tube or rod as shown in FIGS. 3 and 5, and preferably has exterior threads on at least the ends of the fastener 18. Each end of the fastener 18 is preferably inserted into the aperture 26 of confronting inserts 16 in order to connect the poles 12 (to which the inserts 16 are connected) together. Preferably, the fastener 18 is threaded into the threaded apertures 26 of the inserts 16 until the interface surfaces 32 of the confronting inserts 16 contact one another to secure the inserts 16 and connected poles 12 together.

Figures 8, 9:
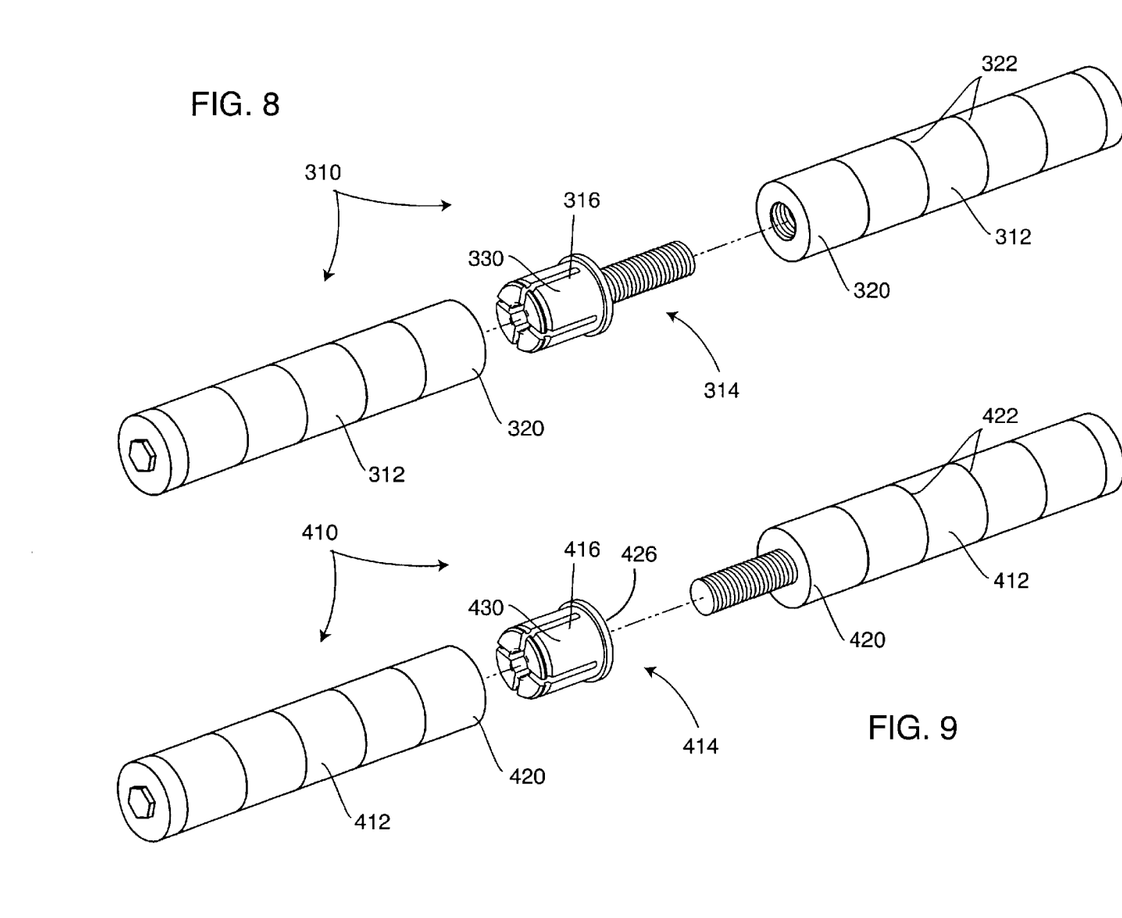
FIG. 8 is an exploded perspective view of a pole and pole connector assembly according to fourth preferred embodiment of the present invention.
FIG. 9 is an exploded perspective view of a pole and pole connector assembly according to a fifth preferred embodiment of the present invention.

Although a separate fastener 18 is preferred in some embodiments of the present invention, it should be noted that the fastener 18 can be permanently connected, integral with, or defined by an extension or end of either of the inserts 16 in the pole connection assembly 14,(see, for example, FIG. 8).

In those embodiments of the present invention employing inserts 16 having projections 36, the fastener 18 can also assist in securing or further securing the inserts 16 within the pole sections 12. Specifically, as the fastener 18 is threaded into the threaded apertures 26 of the inserts 16, the fastener 18 preferably forces the projections 36 radially outward from the axis of the insert 16. As the projections 36 are forced outward from the axis, the projections 36 preferably press against the interior surface of the pole section 12, thereby generating a tighter fit of the insert 16 within the end 20 of the pole section 12. This action also preferably generates further engagement of the elements or features connecting the insert 16 to the pole section 12 as described above (e.g., tongue 24 and groove 42 in the illustrated preferred embodiment), thereby resulting in a more secure insert-pole section connection. Although the fastener 18 of the present invention need not assist in engaging features or elements of the insert 16 and pole section 12 and need not assist in increasing pressure and frictional force between these elements, these functions are highly preferred for improved pole connection strength.

Inserts 16 having projections as described above are most preferred due to their ability to expand in order to create a better engagement of the inserts 16 within the pole sections 12. Whether expandable by a fastener 18 as described above or not, such projections can also provide a snap-fit engagement of the insert with the pole section 12. In this regard, it should be noted that in some embodiments of the present invention, the fastener 18 is permanently secured to either or both inserts 16 or is integral to either or both inserts 16. In such cases, the insert and fastener assembly is inserted into either or both pole ends 20 and is pressed therein until the inserts 16 are snapped into engagement therein.

A method of assembling a pole connector assembly 14 according to the illustrated preferred embodiment of the present invention will now be discussed by way of example only. First, an insert 16 is preferably inserted into each of the open ends 20 of two pole sections 12 to be connected. The leading surfaces 44 and the tapered edges 46 of the inserts 16 preferably slide past the tongues 42 on the interior surfaces of the pole sections 12. As the cap portions 28 contact the pole ends 20, the tongue 24 preferably slides into engagement with the grooves 42 on the projections 36. With the inserts now connected to the pole sections 12, the fastener 18 is preferably threaded into one of the inserts 16, forcing the projections 36 to expand and engage the interior surface and tongue 24 of the pole section 12 more tightly. The other insert 16 is then preferably threaded onto the fastener 18 until the interface surfaces 32 of the two inserts 16 contact each other. Preferably, the fastener 18 is fully threaded into both inserts 16 when the interface surfaces 32 of the inserts 16 are in contact with one another.

When the interface surfaces 32 are in contact with one another, the peripheral edges 24 of these surfaces preferably form a shelf or rack groove to which a shelf or rack 2 can be connected. In some alternative embodiments however, no part of one insert or both inserts 16 is visible after the fastener 18 has been completely tightened and the interface surfaces 32 are in abutting relationship (such as when the cap portion 28 of the inserts 16 have a diameter that is smaller than the inner diameter of the pole sections 12).

Although the above method for assembling the pole connector assembly 14 is preferred, one having ordinary skill in the art will appreciate that the pole connector assembly 14 and pole sections 12 can be assembled in other ways still resulting in a structure falling within the spirit and scope of the present invention.

The spreading action of the projections 36 in the illustrated preferred embodiment of the present invention is generated by threading the fastener 18 into the insert 16 and between the projections 36. This deflection action is even possible where the insert 16 has only one projection 36, in which case the projection 36 is preferably pushed by the threaded fastener 18 toward an interior wall of the pole section 12. It will be appreciated by one having ordinary skill in the art that the projections 36 can be deflected to press against an interior wall of the pole section 12 and/or against a projection, recess, or other feature associated with the interior wall (e.g., a tongue 24 as described above) in a number of other manners, each of which falls within the spirit and scope of the present invention.

For example, the fastener 18 can instead be ribbed or have a series of lips or other protrusions to act as a ratchet. In such an example, as the fastener 18 is forced into the insert aperture 26 between the projections 36, the fastener 18 pushes the projections 36 apart and toward the interior wall of the pole section 12. The ribs of the fastener 18 can take any shape desired, and in some highly preferred embodiments have a frusto-conical or wedge-shape so that the fastener 18 can readily move along the interior surfaces of the projections 36 in an insertion direction but resist movement in an opposite direction to help prevent inadvertent or unwanted withdrawal of the fastener 18. In some embodiments, each protrusion on the fastener 18 can have a lead face and a locking face with an angled surface therebetween. The angled surface tapers from the lead face to the locking face, due to a smaller size (e.g., narrow diameter) of the lead face. The protrusions on the fastener 18 therefore resist removal of the fastener 18 from the aperture 26 after the fastener 18 has been inserted between the projections 36.

In this regard, the aperture 26 can have a plurality of ribs, flanges, lips, pins, or other protrusions directed axially inward to engage the ribs of the fastener 18 as the fastener 18 is inserted into the aperture 26. The protrusions can be made of a resilient material that allows the fastener 18 to easily pass by the protrusions upon insertion, but resist the fastener 18 from being pulled out of the insert 16. As the fastener 18 is inserted into the aperture 26 in the insert 16, the protrusions on the fastener 18 push through the inwardly-directed ribs, flanges, lips, pins, or other protrusions of the projections 36, which prevent the fastener 18 from being pulled out of the aperture 26 as just described. Insertion of the fastener 18 also preferably causes the projections 36 to deflect toward the interior walls of the pole section 12 in order to engage the insert 16 within the pole section 12 as described above.

As described above, in other embodiments frictional engagement of the fastener 18 within the aperture 26 in the insert 16 is relied upon to secure the insert 16 within the pole section 12 and to secure the fastener 18 within the insert 16. In some of these embodiments, the outer diameter of the fastener 18 is the same or slightly larger than at least an inner portion of the aperture 26 in the insert 16. Preferably, the fastener 18 has a diameter that is sufficiently large to force the projections 36 of the insert 16 radially outward from the axis of the insert 16 when the fastener 18 is forced into the aperture 26. Frictional engagement between the fastener 18 and the insert 16 therefore secures the fastener 18 to the insert 16. Deflection of the projection(s) 36 caused by forcing the fastener 18 into the aperture 26 causes the projection(s) 36 to frictionally engage the inside walls of the pole section 12 and/or to exert force upon those features and elements (e.g., tongue 24 and groove 42) connecting the insert 16 to the pole section 12.

In the illustrated preferred embodiment of the present invention, the fastener 18 is used to connect inserts 16 in adjacent pole sections 12. It should be noted that the present invention is not limited to the use of two inserts 16 in a pole connection assembly 14. Some pole connection assemblies according to the present invention employ only one insert 16 in one of the two pole sections 12 to be connected. An example of such a pole connection assembly is illustrated in FIG. 6, wherein elements and features corresponding to those of the embodiment illustrated in FIGS. 1–5 are numbered in the 100 series.

Figures 6, 7:
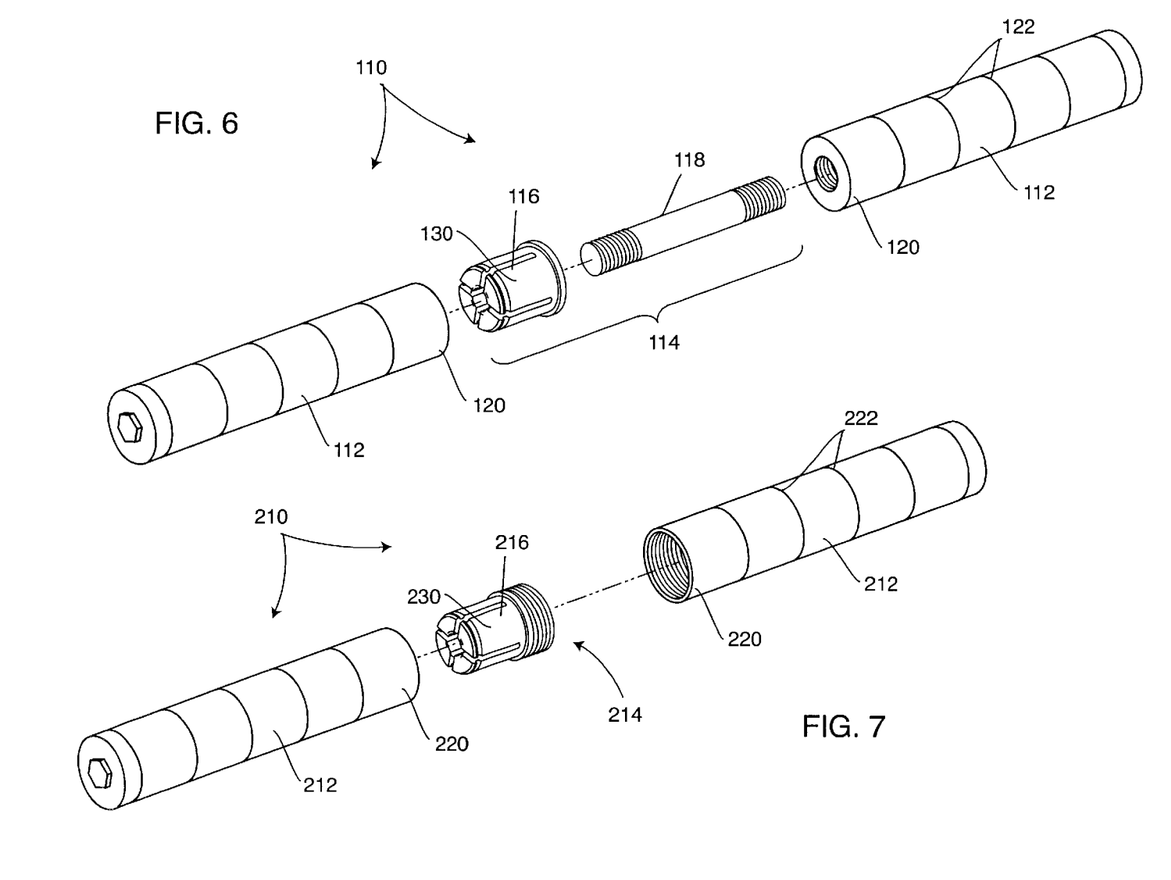
FIG. 6 is an exploded perspective view of a pole and pole connector assembly according to a second preferred embodiment of the present invention.
FIG. 7 is an exploded perspective view of a pole and pole connector assembly according to a third preferred embodiment of the present invention.

The pole connection assembly 114 in FIG. 6 is similar to the pole connection assembly 14 illustrated in FIGS. 1–5, with the exception that the pole connection assembly 114 has only one insert 116. Rather than employ an insert in both pole sections 112, one pole section 112 has an insert 116 while the other pole section 112 has an end that is partially or completely closed. The fastener 118 can be threaded into the insert 116 and into a threaded aperture 48 in the end of the second pole section 112 in order to connect the pole sections 112 together. Any other type of fastener 118 can instead be used to connect the insert 116 with the end of the second pole section 112 (whether closed or open and regardless of the shape of the second pole section 112).

Another example of an embodiment of the present invention having a single pole insert in the pole connection assembly is illustrated in FIG. 7. The elements and features of the pole connection assembly 214 in FIG. 7 corresponding to those of the embodiment illustrated in FIGS. 1–5 are numbered in the 200 series. Like the pole connection assembly 114 of the embodiment illustrated in FIG. 6, the insert 216 is received within and connected to one pole section end 220 in any of the manners described above with reference to the embodiment illustrated in FIGS. 1–5. The embodiment of the present invention shown in FIG. 7 illustrates the fact that the pole connection assembly of the present invention need not necessarily have a separate fastener to connect adjacent inserts (see FIGS. 1–5) or to connect an insert directly to a pole section (see FIG. 6). Rather than employ a fastener to connect the insert 216 and the first pole section 212 to the second pole section 212, the other end of the insert 216 has external threads which are threaded into an internally-threaded end 220 of the second pole section 212. Although a fastener is not required to help retain the insert 216 within the first pole section as described above (in which case the insert 216 can be retained within the pole section 212 in the various alternative manners described herein), such a fastener is preferred.

In an alternative embodiment illustrated in FIG. 8, the insert 316 can have an externally-threaded post, rod, or other extension permanently connected thereto or integral therewith for threaded connection to an internally-threaded aperture in a partially or fullyclosed end of the second pole section 312. Other manners (e.g., not employing a threaded connection) of directly connecting an exposed end of the insert 316 to the second pole section 312 are possible, and fall within the spirit and scope of the present invention.

Yet another example of an embodiment of the present invention having a single pole insert in the pole connection assembly is illustrated in FIG. 9. The elements and features of the pole connection assembly 414 in FIG. 9 corresponding to those of the embodiment illustrated in FIGS. 1–5 are numbered in the 400 series. The insert 416 is preferably received within and connected to one pole section end 420 in any of the manners described above with reference to the embodiment illustrated in FIGS. 1–5. The second pole section 412 preferably has an externally-threaded post, rod, or other extension permanently connected to or integral with an end 420 of the second pole section 412. The end 420 of the second pole section 412 can be partially closed or fully closed as shown in FIG. 9. The externally-threaded post, rod, or other extension can be threaded into an aperture 426 in the insert 416 for connection of the second pole section 412 to the insert 416 and to the first pole section 412. Other manners (e.g., not employing a threaded connection) of connecting an extension of one pole section 412 to an insert 416 in another pole section 412 are possible, and fall within the spirit and scope of the present invention.

Figure 10:
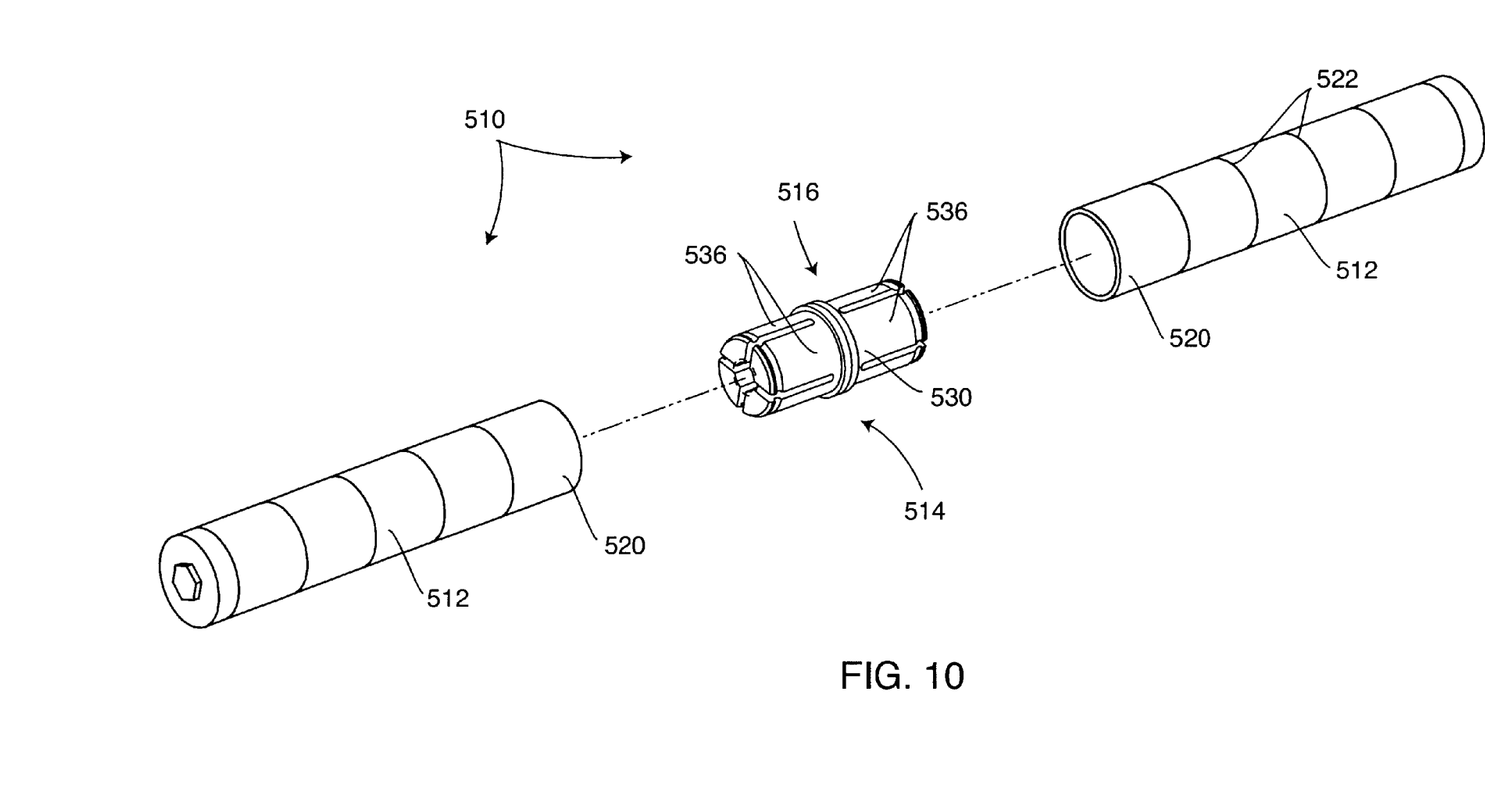
FIG. 10 is an exploded perspective view of a pole and pole connector assembly according to a sixth preferred embodiment of the present invention.

Another embodiment of the present invention having only one pole insert in a pole connection assembly is illustrated in FIG. 10. The elements and features of the pole connection assembly 514 in FIG. 10 corresponding to those of the embodiment illustrated in FIGS. 1–5 are numbered in the 500 series. The insert 516 preferably has projections 536 which extend in both directions away from a body portion 530 of the insert 516, and can have a shape similar to two inserts 16 of the first preferred embodiment connected back-to-back (i.e., with the interface surfaces 32 in contact with one another). The insert 516 can have a larger diameter center portion as illustrated in FIG. 10 similar in shape to the two adjacent cap portions 28 of the assembled connection assembly 14 in the first preferred embodiment. Alternatively, the insert 516 can have substantially the same diameter along its entire length. The insert 516 illustrated in FIG. 10 can be inserted into each of the ends 520 of two adjacent pole sections 512, each of which can have any of the features and elements described above with reference to the embodiment illustrated in FIGS. 1–5 in order to connect the insert 516 to the pole sections 512.

As is clear from the various embodiments of the present invention described above and illustrated in the figures, the present invention is not limited to connection assemblies having two inserts, but includes connection assemblies having one insert received within one or both pole sections of a pair of pole sections. Furthermore, although several embodiments of the present invention employ a fastener to connect two inserts together or to connect an insert in one pole section directly to another pole section, some embodiments of the present invention do not employ a separate fastener. Other embodiments employ a fastener for the purpose of deflecting the projections as described above in order to secure or more fully secure an insert within a pole section end. For example, the fastener can be threaded into an aperture of an insert as described above, but does not connect the insert to another insert or to another pole section.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the inserts 16 of the present invention need not necessarily be hub-shaped as illustrated in the figures. Instead, the inserts 16 can have a base that has a cross or spider shape and from which relatively thin, elongated fingers extend into the pole ends 20. The fingers are moved by the fastener 18 as the fastener 18 is inserted between the fingers. Like the projections 36 in the embodiments described above, the fingers are preferably deflected by the fastener to press against or otherwise engage the interior walls of the pole section 12 in order to secure the inserts 16 within the pole section 12. The fingers can also engage with the fastener (e.g., by threads, ribs, frictional engagement, and the like) to prevent the fastener from backing out once installed between the fingers.

We claim:

1. A pole connector assembly for connection of two sections of a pole, the pole connector assembly comprising:
   an insert dimensioned to be received within an end of a first pole section, the insert having:
      a one-piece unitary body portion having at least one projection, the projection extending from and being deflectable with respect to a remainder portion of the insert, the remainder portion having a surface; and
      an aperture defined in the surface of the remainder portion; and
   a fastener engageable within the aperture in the body portion of the insert and connectable to a second pole section, the fastener movable from a first position with respect to the projection and remainder portion of the insert in which the projection is deflected by the fastener a first amount to a second position with respect to the projection and remainder portion of the insert in which the projection is deflected by the fastener a second amount toward an internal wall of the first pole section.

2. The pole connector assembly as claimed in claim 1, wherein the insert has a base from which at least two projections extend, the aperture extending through the base and defined in part by the at least two projections.

3. The pole connector assembly as claimed in claim 2, wherein the aperture and fastener are threaded, the fastener movable between the first and second positions by threading the fastener with respect to the insert.

4. The pole connector assembly as claimed in claim 3, wherein the fastener is in a loosened state with respect to the insert when the fastener is in the first position and is in a tightened state with respect to the insert when the fastener is in the second position.

5. The pole connector assembly as claimed in claim 1, wherein the insert is a first insert, the pole connector further comprising a second insert dimensioned to be received within an end of the second pole section, the second insert having:
  a body portion having at least one projection, the projection being deflectable with respect to a remainder portion of the second insert; and
  an aperture defined in the body portion;
wherein opposite ends of the fastener are engagable within the apertures in the body portions of the first and second inserts, the fastener being movable with respect to each of the first and second inserts from respective first positions with respect to the first and second inserts in which the at least one projection of each insert is not deflected by the fastener to respective second positions with respect to the first and second inserts in which the at least one projection of each insert is deflected by the fastener toward an internal wall of the first and second pole sections, respectively.

6. The pole connector assembly as claimed in claim 1, wherein:
  the fastener and aperture are threaded; and
  the aperture is at least partially defined by the at least one projection for threaded engagement with the fastener.

7. The pole connector assembly as claimed in claim 1, wherein the at least one projection is shaped to engage an internal wall of the first pole section upon deflection of the at least one projection.

8. The pole connector assembly as claimed in claim 7, wherein the at least one projection is engagable with the internal wall of the first pole section by a tongue and groove connection.

9. The pole connector assembly as claimed in claim 7, wherein the at least one projection is frictionally engagable with the internal wall of the first pole upon deflection of the at least one projection.

10. The pole connector assembly as claimed in claim 1, wherein the insert further comprises a cap portion shaped to abut an end of the first pole section upon insertion of the insert into the first pole section.

11. The pole connector assembly as claimed in claim 10, wherein the cap portion of the insert has a recessed peripheral edge at least partially defining a circumferential groove about the insert.

12. The pole connector assembly as claimed in claim 1, wherein the insert is snap fit into a position within the first pole section, wherein the snap fit is between an internal wall of the first pole section and the at least one projection of the insert.

13. A pole assembly, comprising:
  a first pole section;
  a second pole section;
  a first one-piece unitary insert received within the first pole section;
  a second one-piece unitary insert received within the second pole section;
  each of the first and second inserts having:
    a base;
    at least one deflectable projection extending from the base; and
    an aperture defined in the base; and
  a fastener having opposite ends received within the apertures of the first and second inserts, the fastener adjustable in the apertures from a first position with respect to the base of each of the first and second inserts in which the at least one deflectable projection of each of the first and second inserts is deflected a first amount by the fastener to a second position with respect to the base of each of the first and second inserts in which the at least one deflectable projection is deflected by the fastener a second amount toward respective inner walls of the first and second pole sections, the second amount being greater than the first amount.

14. The pole assembly as claimed in claim 13, wherein:
  each of the first and second inserts has at least two deflectable projections extending from the base; and
  the aperture of each of the first and second inserts extends through the base and between the at least two deflectable projections.

15. The pole assembly as claimed in claim 13, wherein:
  the fastener and the apertures in the first and second inserts are threaded; and
  the fastener is adjustable in the apertures of the first and second inserts by being threaded therein.

16. The pole assembly as claimed in claim 13, wherein the first and second inserts are secured within the first and second poles, respectively, by engagement of the deflectable projections with inner surfaces of the first and second poles, respectively, when the deflectable projections are deflected by the fastener.

17. The pole assembly as claimed in claim 16, wherein the engagement of the deflectable projections with the inner surfaces of the first and second poles is frictional engagement against the inner surfaces of the first and second poles.

18. The pole assembly as claimed in claim 16, wherein the deflectable projections are shaped to engage the inner surfaces of the first and second poles via tongue and groove connections.

19. The pole assembly as claimed in claim 13, wherein the at least one deflectable projection of each insert is engagable with the first and second poles, respectively, via a tongue and groove connection.

20. The pole assembly as claimed in claim 13, wherein each of the first and second inserts has a cap which at least partially covers an end surface of the first and second poles, respectively.

21. The pole assembly as claimed in claim 20, wherein at least one of the caps of the first and second inserts has a recessed peripheral edge defining a circumferential groove about the first and second inserts.

22. The pole assembly as claimed in claim 13, wherein the first and second inserts are in abutting relationship with one another and are connected together by the fastener.

23. A method of assembling a pole, comprising:
  inserting a first insert into an end of a first pole section;
  inserting a fastener into an aperture in the first insert;
  deflecting a portion of the first insert located within the first pole section with the fastener responsive to insertion of the fastener into the aperture in the first insert;
  tightening the fastener in the aperture in the first insert by axially moving the fastener with respect to the portion of the first insert, the fastener further deflecting the portion of the first insert;
  engaging an inner surface of the first pole section with the portion of the first insert; and
  connecting the fastener to a second pole section.

24. The method as claimed in claim 23, further comprising abutting a portion of the first insert against an end of the first pole section.

25. The method as claimed in claim 23, wherein inserting a fastener includes threading the fastener into a threaded aperture in the first insert.

26. The method as claimed in claim 25, further comprising threading the fastener against the portion of the first insert.

27. The method as claimed in claim 23, wherein:

the portion of the first insert is one of at least two portions of the first insert; and inserting a fastener includes threading the fastener between the at least two portions of the first insert.

28. The method as claimed in claim 23, wherein inserting the fastener into the aperture includes inserting the fastener between the portion of the first insert and another portion of the first insert.

29. The method as claimed in claim 23, wherein engaging the inner surface includes frictionally engaging the inner surface.

30. The method as claimed in claim 23, wherein engaging the inner surface includes pressing together inter-engaging elements of the first pole section and the portion of the first insert.

31. The method as claimed in claim 23, further comprising snap-fitting the first insert within the first pole.

32. The method as claimed in claim 23, wherein connecting the fastener to a second pole section includes performing the deflecting, engaging, and both inserting steps with a second insert and a second pole section.

33. A pole connector assembly for connecting two pole sections, the pole connector assembly comprising:

an insert dimensioned to be received within an end of a first pole section, the insert having:
a body having at least one portion being deflectable outwardly from the body; and
an aperture defined in the body; and a fastener having one end engageable within the aperture, the fastener being adjustable in the aperture from a first axial position with respect to the at least one portion to a second axial position with respect to the at least one portion to directly deflect the at least one body portion toward an internal surface of the first pole section, and a second end coupled to a second pole section.

* * * * *